United States Patent
Xu et al.

(10) Patent No.: US 10,062,458 B2
(45) Date of Patent: Aug. 28, 2018

(54) SIC MATRIX FUEL CLADDING TUBE WITH SPARK PLASMA SINTERED END PLUGS

(71) Applicants: WESTINGHOUSE ELECTRIC COMPANY LLC, Cranberry Township, PA (US); KABUSHIKI KAISHA TOSHIBA, Tokyo (JP)

(72) Inventors: Peng Xu, Columbia, SC (US); Edward J. Lahoda, Edgewood, PA (US); Lars Hallstadius, Vasteras (SE); Joon Hyung Choi, Lexington, SC (US); Shinichi Higuichi, Kanagawa (JP); Fumihisa Kano, Kawasaki (JP)

(73) Assignee: Westinghouse Electric Company LLC, Cranberry Township, PA (US)

( * ) Notice: Subject to any disclaimer, the term of this patent is extended or adjusted under 35 U.S.C. 154(b) by 306 days.

(21) Appl. No.: 15/225,127

(22) Filed: Aug. 1, 2016

(65) Prior Publication Data
US 2016/0358673 A1 Dec. 8, 2016

Related U.S. Application Data

(62) Division of application No. 14/027,299, filed on Sep. 16, 2013, now Pat. No. 9,455,053.

(51) Int. Cl.
*G21C 3/10* (2006.01)
*C04B 37/00* (2006.01)
(Continued)

(52) U.S. Cl.
CPC .............. *G21C 3/10* (2013.01); *C04B 37/001* (2013.01); *C04B 37/005* (2013.01); *C04B 37/02* (2013.01);
(Continued)

(58) Field of Classification Search
CPC .............. G21C 3/10; G21C 3/16; G21C 3/105
See application file for complete search history.

(56) References Cited

U.S. PATENT DOCUMENTS

| | | |
|---|---|---|
| 3,427,222 A | 2/1969 | Biancheria et al. |
| 3,725,635 A | 4/1973 | Fink et al. |
| | (Continued) | |

FOREIGN PATENT DOCUMENTS

| | | |
|---|---|---|
| JP | H0384887 A | 4/1991 |
| JP | 2012-233734 A | 11/2012 |
| WO | WO2006076039 A2 | 7/2006 |

OTHER PUBLICATIONS

J. R. McDermid et al., "Thermodynamic Brazing Alloy Design for Joining Silicon Carbide," J. Am. Ceram. Soc., 74(8), (1991), pp. 1855-1860, Montreal, Canada.
(Continued)

*Primary Examiner* — Jack W Keith
*Assistant Examiner* — Lily C Garner
(74) *Attorney, Agent, or Firm* — Joseph C. Spadacene; Westinghouse Electric Company LLC

(57) ABSTRACT

A method of providing an end-capped tubular ceramic composite for containing nuclear fuel (34) in a nuclear reactor involves the steps of providing a tubular ceramic composite (40), providing at least one end plug (14, 46, 48), applying (42) the at least one end plug material to the ends of the tubular ceramic composite, applying electrodes to the end plug and tubular ceramic composite and applying current in a plasma sintering means (10, 50) to provide a hermetically sealed tube (52). The invention also provides a sealed tube made by this method.

11 Claims, 4 Drawing Sheets

(51) Int. Cl.
*C04B 37/02* (2006.01)
*G21C 3/07* (2006.01)
*G21C 21/02* (2006.01)

(52) U.S. Cl.
CPC .............. *C04B 37/021* (2013.01); *G21C 3/07* (2013.01); *G21C 21/02* (2013.01); *C04B 2235/6562* (2013.01); *C04B 2235/6567* (2013.01); *C04B 2235/666* (2013.01); *C04B 2237/36* (2013.01); *C04B 2237/365* (2013.01); *C04B 2237/38* (2013.01); *C04B 2237/40* (2013.01); *C04B 2237/52* (2013.01); *C04B 2237/765* (2013.01); *C04B 2237/80* (2013.01); *C04B 2237/84* (2013.01); *G21Y 2002/302* (2013.01); *G21Y 2004/301* (2013.01); *Y02E 30/40* (2013.01)

(56) References Cited

U.S. PATENT DOCUMENTS

| | | | |
|---|---|---|---|
| 4,925,608 | A | 5/1990 | Rossi et al. |
| 5,075,075 | A | 12/1991 | Kapil |
| 5,182,077 | A | 1/1993 | Feinroth |
| 5,338,576 | A | 8/1994 | Hanzawa et al. |
| 5,375,756 | A | 12/1994 | Haughton et al. |
| 5,391,428 | A | 2/1995 | Zender |
| 5,447,683 | A | 9/1995 | Montgomery et al. |
| 5,975,407 | A | 11/1999 | Gasse et al. |
| 6,246,740 | B1 | 6/2001 | Maruyama et al. |
| 6,697,448 | B1 | 2/2004 | Korton |
| 7,139,360 | B2 | 11/2006 | Lahoda |
| 2003/0038166 | A1 | 2/2003 | Gasse |
| 2006/0039524 | A1 | 2/2006 | Feinroth et al. |
| 2007/0189952 | A1 | 8/2007 | Easler et al. |
| 2010/0139840 | A1 | 6/2010 | Allemand et al. |
| 2013/0004235 | A1 | 1/2013 | Chaumat et al. |

OTHER PUBLICATIONS

Z. A. Munir et al., "The effect of electric field and pressure on the synthesis and consolidation of materials: A review of the spark plasma sintering method," J. Mater Sci 41 (2006), pp. 763-777.

C. H. Henager, Jr. et al., "Coatings and joining for SiC and SiC-composites for nuclear energy systems," ScienceDirect, Journal of Nuclear Materials, (2007), pp. 1139-1143.

J. Li et al., "A high temperature Ti-Si eutectic braze for joining SiC," ScienceDirect, Journal of Nuclear Materials (2008), pp. 3135-3138.

M. Ferraris et al., "Joining of machined SiC/SiC composites for thermonuclear fusion reactors," Science Direct, Journal of Nuclear Materials, (Feb. 5, 2008), pp. 410-415.

W. Tian et al., "Effect of composition and joining parameters on microstructure and mechanical properties of silicon carbide joints," Journal of the Ceramic Society of Japan (2010), pp. 799-804.

W. Tian et al., "Reaction joining of SiC ceramics using TiB2-based composites," ScienceDirect, Journal of the European Ceramic Society, (2010), pp. 3203-3208.

M. Ferraris et al., "Joining of SiC-based materials for nuclear energy applications," ScienceDirect, Journal of Nuclear Materials, (2011), pp. 379-382.

L. Gao et al., "Mechanical Properties and Microstructure of Nano-SiC-Al2O3 Composites Densified by Spark Plasma Sintering", Journal of the European Ceramic Society, 1999.

L. Hallstadius et al., "Cladding for High Performance Fuel", Progress in Nuclear Energy, 2012.

SIC MATRIX FUEL CLADDING TUBE WITH SPARK PLASMA SINTERED END PLUGS

RELATED APPLICATIONS

This application is a division of co-pending U.S. application Ser. No. 14/027,299 filed Sep. 16, 2013.

BACKGROUND

1. Field

The invention relates to a fuel rod cladding tube made out of silicon carbide (herein referred as SiC), regardless the cladding design architecture (monolithic, duplex with monolithic SiC on the inside and a composite made with SiC fibers and SiC matrix on the outside, etc.) with a spark plasma sinter sealed end plug.

2. Description of Related Art

In a typical nuclear reactor, such as a pressurized water (PWR), heavy water (such as a CANDU) or a boiling water reactor (BWR), the reactor core includes a large number of fuel assemblies, each of which is composed of a plurality of elongated fuel elements or fuel rods. The fuel rods each contain nuclear fuel fissile material such as at least one of uranium dioxide ($UO_2$), plutonium dioxide ($PuO_2$), uranium nitride (UN) and/or uranium silicide ($U_3Si_2$); with possible additions of, for example, boron or boron compounds, gadolinium or gadolinium compounds and the like either on or in pellets, usually in the form of a stack of nuclear fuel pellets, although annular or particle forms of fuel are also used. The fuel rods have a cladding that acts as a containment for the fissile material. The fuel rods are grouped together in an array which is organized to provide a neutron flux in the core sufficient to support a high rate of nuclear fission and thus the release of a large amount of energy in the form of heat. A coolant, such as water, is pumped through the core in order to extract the heat generated in the core for the production of useful work. Fuel assemblies vary in size and design depending on the desired size of the core and the size of the reactor.

The cladding on the fuel rods is usually made from zirconium (Zr) with up to about 2 wt. % of other metals such as Nb, Sn, Fe and Cr. Such zirconium alloy clad tubes are taught, for example, by Biancheria et al., Kapil and Lahoda (U.S. Pat. Nos. 3,427,222; 5,075,075; and 7,139,360, respectively). The fuel rods/cladding have an end cap at each end and a hold down device such as a metal spring to keep the stack of nuclear fuel pellets in place. FIG. 1 illustrates this type of prior art design, showing a string of fuel pellets 10, a zirconium-based cladding 12, a spring holdown device 14, and end caps 16.

There are problems associated with metal clad fuel rods. They can wear if contacted by debris that may be present in the cooling water mentioned before. Under severe conditions such as "beyond design basis" accidents; metal cladding can react exothermally with steam at over 1,093° C. (2,000° F.). These zirconium cladding metals protecting the nuclear fuel may lose strength during "a loss of coolant" accident, where reactor temperatures can reach as high as 1,204° C. (2,200° F.), and expand due to internal fission gases within the fuel rod. In addition, continuing utility industry demands have pushed reactor operating temperatures and cladding radiation exposure to extreme limits.

All this has prompted considering use of experimental ceramic type materials such as silicon carbide (SiC) monolith, fibers and their combinations as taught by Maruyama et al. (U.S. Pat. No. 6,246,740), Zender, (U.S. Pat. No. 5,391, 428), Hanzawa et al., (U.S. Pat. No. 5,338,576); Feinroth (U.S. Pat. No. 5,182,077 and U.S. Patent Publication No. 2006/0039524 A1), Easier et al. (U.S. Patent Publication No. 2007/0189952 A1); and tangentially Korton, (U.S. Pat. No. 6,697,448) as complete or partial substitutes for metal fuel rods.

The absolutely right combination must be sought in the nuclear industry to make usually brittle ceramic, much more flexible, to relieve stress/temperature/pressure in full failure conditions. One possibility is use of experimental SiC fiber reinforced SiC composites; a two or three-layer tube of high purity beta or alpha phase stoichiometric silicon carbide covered by a central composite layer of continuous beta phase stoichiometric silicon carbide fibers infiltrated with beta phase SiC and, in the case of three layers, an outer protective layer of fine grained beta phase silicon carbide. It has been suggested to pre-stress the fiber component, forming the fibers into tows and tow reverse winding overlapping; where the fibers are coated with a less than a micrometer of SiC or carbon or graphite or boron nitride to provide a weak interface allowing slippage, all this to get better strain resistance and flexibility. Feinroth et al. in U.S. Patent Publication No. 2006/0039524 A1, herein incorporated by reference, describes such nuclear fuel tubes and a matrix densification using well known processes of chemical vapor infiltration (CVI), polymer impregnation, and pyrolysis (PIP). Alumina ($Al_2O_3$) fibers in an alumina matrix have also been suggested as a substitute.

As used herein, the term "Ceramic Composite" will mean and is defined as all of the above described composite type structures including SiC and $Al_2O_3$.

Surprisingly, very little is said about the end plugs for such ceramic composites. In fact, finding a sealing technology that attaches an end plug, and ensures hermeticity for a Ceramic Composite cladding, such as a silicon-carbide fuel rod cladding has been a very elusive task so far, due to the various requirements placed on such an interface joint that is to:

ensure mechanical strength during and after normal operation, anticipated operational occurrences, infrequent accidents, and limiting faults;

ensure the hermeticity of the end plug-to-cladding joint under irradiation and the nuclear reactor-specific corrosive environment;

allow the joining process to accommodate fully-loaded cladding (with fuel pellets and a hold down device). In addition, the end plug and sealing technology must allow for pressurization of the fuel rod with Helium or other thermally conductive backfill gas at pressures typically up to 300 psi; and allow the joining process to accommodate economy-of-scale commercial use.

Several sealing technologies have been explored in the recent past; but to date none of them proved successful in a nuclear environment, which is essential here. Thus, there are a number of sealing technologies suggested, that use various compounds (other than SiC) to seal SiC parts (e.g., Ti-based formulations, Al—Si formulations), including brazing and other techniques, for example: V. Chaumat et al, U.S. Patent Publication No. 2013/0004325A1; A. Gasse, U.S. Patent Publication 2003/0038166; A. Gasse et al., U.S. Pat. No. 5,975,407; F. Montgomery et al., (U.S. Pat. No. 5,447,683); G. A. Rossi et al., (U.S. Pat. No. 4,925,608); and McDermid, "Thermodynamic brazing alloy design for joining silicon carbide," *J. Am. Ceram. Soc.*, Vol. 74, No. 8, pp. 1855-1860, 1991.

There has been an explosion of research on SiC joining technology since 2007; for example: C. H. Henager, Jr. et al., "Coatings and joining for SiC and SiC composites for nuclear energy systems," *Journal of Nuclear Materials*, 367, 370 (2007) 1139-1143; M. Ferraris et al., "*Joining of machined SiC/SiC composites for thermonuclear fusion reactors,*" *Journal of Nuclear Materials*, 375 (2008) 410-415; J. Li et al., "A high temperature Ti—Si eutectic braze for joining SiC," *Materials Letters*, 62 (2008), 3135-3138; W. Tian, "Reaction joining of SiC ceramics using $TiB_2$-based composites," *Journal of the European Ceramic Society*, 30 (2010) 3203-3208 and M. Ferraris et al., "Joining of SiC-based materials for nuclear energy applications," *Journal of Nuclear Materials*, 417 (2011) 379-382. These articles are attempting to apprise utilities, of means to ensure higher and higher outputs. The utilities are requiring more and more stressed designs and materials as is economically necessary to meet world energy needs.

The above ceramic models are no longer experiments and are generally shown to have high mechanical strength, and are thought capable of realizing the required gas-tightness for a nuclear reactor; however, these joining technologies failed to show the corrosion and irradiation resistance necessary to survive in a nuclear reactor environment for a typical lifetime of a fuel rod. Other sealing technologies (e.g., experimental spark plasma sintering—hereinafter "SPS") described by Munir et al., "The effect of electric field and pressure on the synthesis and consolidation of materials herein incorporated by reference, describes: a review of the spark plasma sintering method," *J. Mater Sci.*, 41 (2006) 763, 777. They make no use of additional chemical compounds; but economical large-scale manufacturing using this process are illusive to this date and still remains a challenge. Hot isostacic pressure (HIP), a well known technique for use in many commercial areas, can also be used to join SiC to SiC; but HIP, noted previously, A Rossi et al., U.S. Pat. No. 4,925,608, is not practical in the fragile environment of sealing nuclear fuel rods due to the long sintering cycle and high temperatures, about 1,700° C., and extremely high pressure, and is not applicable to mass production. What is needed is a commercially viable joining method for sealing tubular ceramic composites with end caps of ceramic or metal.

It is a main object of this invention to provide a method for producing high strength, hermetically sealed, commercially useful and viable end plug seals and methods, resistant to irradiation in a dramatic nuclear environment using ceramic composite tubes as a basis for containing the fuel pellets.

SUMMARY

This invention, in order to solve the above problems and provide the main object, is related to a method of providing an end-capped tubular ceramic composite which can be filled with nuclear fuel, comprising the steps of:
(1) providing a tubular Ceramic Composite having tube walls and a circumferential axis and separately at least one end plug material;
(2) applying the at least one end plug material, preferably a finely machined sanded material, to at least one end of the tubular ceramic composition, the end plug having an exterior and interior side contacting the tubular ceramic composite at a plug/cladding interface;
(3) applying at least one primary electrode to the exterior side of the at least one end plug;
(4) optionally applying at least one secondary electrode to the exterior side of the tubular ceramic composite; and
(5) applying electrical current to the electrodes present; using spark plasma sintering to supply a rapid temperature rise in the plug/cladding interface of up to 1,500° C./min.; where the interface temperatures at the end plug interface with the cladding tube end are ambient to 2,500° C.

The invention in a more detailed, preferred form also relates to a method comprising the steps of:
(1) providing a tubular Ceramic Composite having tube walls and a circumferential axis and separately at least one end plug material;
(2) applying the at least one end plug, preferably a finely machined sanded ceramic or metal end plug composition or ceramic precursor composition material, to at least one end of the tubular ceramic composition, the end plug having an exterior and interior side contacting the tubular ceramic composite at a plug/cladding interface;
(3) applying at least one primary electrode to the exterior side of the at least one ceramic end plug;
(4) optionally applying at least one secondary circumferential electrode to the exterior side of the tubular ceramic composite; and
(5) applying electrical current to the electrodes present using a spark plasma sintering technique to supply a rapid temperature rise at the plug/cladding interface of up to 1,500° C./min; where interface temperatures at the end plug-tube interface with the cladding tube end are from ambient to 2,500° C., applied from 0.01 to 6.0 minutes at pressures from 0.001 MPa to 50.0 MPa to hermetically seal the tube to the at least one end cap. The average current is 200 A-800 A (amps) and the peak pulsed voltage is 2-4 V (volts) and the time is preferably 5 minutes to 60 minutes.

The ceramic end caps are preferably the same or a precursor of the same material as the ceramic composite which will transition to that material upon heating.

The operating parameters of the generally known spark plasma process (SPS process), except for particular critical ranges disclosed and discovered herein, are preferably: applying temperature rises at the plug/cladding gaps/interface of up to 1,500° C./min, at a rapid rate of preferably 100° C./min. to 1,000° C./min., most preferable 1,000° C./min. and up to a peak temperature of 2,500° C., preferably 1,800° C. to 2,150° C., most preferably 2,100° C. at 1.0 to 6.0 minutes and 5.0 to 10 MPa. As shown in FIG. 2 vs. FIGS. 3-4, the circumferential electrode 24 is optional but preferred. The simpler technique of FIG. 2, uses just two end electrodes 22. Both electrical applications are useful. Also, preferably a bonding pressure is applied after step (4) of 4 MPa to 20 MPa with a hold time of 5 minutes to 60 minutes; and an inner gas such as helium is inserted/injected/pumped into the tube after step (1) or step (2) possibly by drilling into the end plug, inserting the gas under pressure and sealing the end plug tube at from 50 to 500 psi.

The preferred end caps are preferably made of SiC. Metal end caps such as zirconium or zirconium alloys or other metals can also be used. A group of ternary carbides or nitrides can also be used as the end cap materials, such as $Ti_2AlC$, $Ti_4AlN_3$, $Ti_3AlC_2$, $Ti_2SiC$, $Ti_3SiC_2$, $Ti_3SnC_2$, $Zr_2AlC$, $Zr_2TiC$, $Zr_2SnC$, $Nb_2SnC$, $Nb_3SiC_2$, $(Zr_xNb_{1-x})_2AlC$ where $0<x<1$.

The most preferred ceramic composite or precursor of the same and end caps are made from a SiC composite comprising monolithic SiC on the inside and at least one of the layers of SiC fibers on a SiC matrix. Most preferably, the end caps interface/contact points and ceramic composite ends are polished. The ceramic composite tube can be from 2 feet to 18 feet (60.96 cm to 546.64 cm) long to accommodate a wide range of reactor designs.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
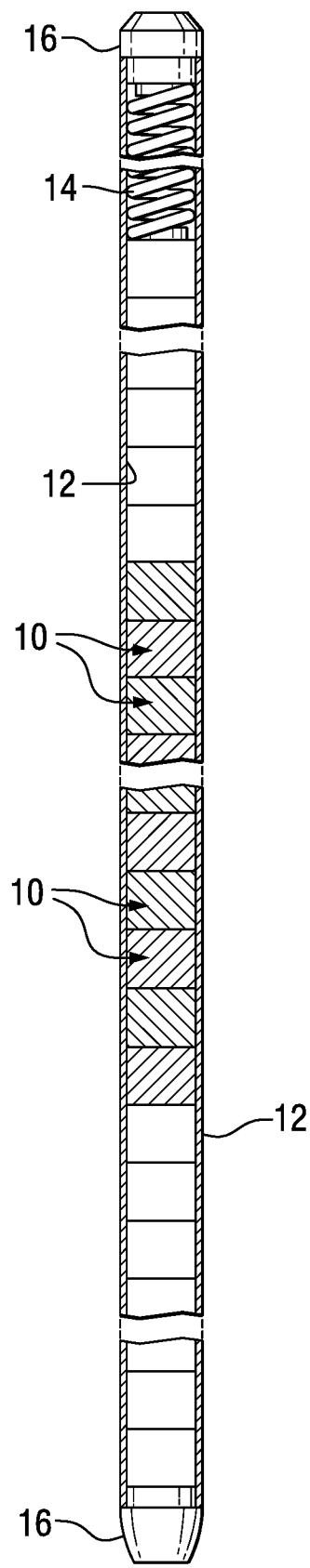
FIG. 1 is an enlarged longitudinal sectional view of a prior art zirconium alloy fuel rod containing fuel pellets, holding spring, and end caps.

The current and standard fuel cladding is made of various zirconium alloys that act as the fission product barrier and prevent release of radioactive materials to the environment. Though zirconium alloys have desirable neutronic properties and, in the past, adequate strength and oxidation resistance in coolant at normal operation conditions, they rapidly oxidize at beyond design basis temperatures above 1,200° C. Because the zirconium steam reaction is exothermic and rapid and hydrogen is produced during this reaction, new materials such as silicon carbide (SiC) have been proposed and experimentally tested, which have much better oxidation resistance than zirconium alloys at temperatures above 1,200° C. Use of advanced SiC-based materials, no longer in the complete experimental stage, can vastly improve the fuel failure temperature by >600° C. compared to the cladding made of zirconium alloy cladding—which in itself is fantastic. This application describes a sealing method that can operate a ceramic nuclear fuel tube in a nuclear reactor at elevated temperatures; and forms a radiation tolerant end seal that can be operated at >1,200° C. on fuel rod tubes made of the above described and defined "ceramic composite."

The "Ceramic Composite" fuel rod tube, as previously defined, is most preferably comprised of multiple layers of ceramic SiC materials, including dense monolithic SiC, SiC—SiC composite. Each of the layers has a specific function that contributes to meeting the performance requirements for the cladding. In one preferred version of "ceramic composite" cladding, the inner layer of the cladding consists of dense monolithic SiC, which has extremely low permeability. The primary function of this layer is containment of fission products. To improve reliability, the cladding may have up to three layers of monolithic SiC to provide redundant containment of fission products. Each layer will be separated by an intermediate layer made of pyrocarbon, that is a material similar to graphite, but with some covalent bonding between its graphene sheets as a result of imperfections in its production, or other material such as boron nitride or boron carbide that prevent the formation of a continuous SiC mass to inhibit crack propagation from one layer to another. The next layer of the cladding structure is a SiC—SiC Ceramic Composite.

A SiC—SiC Ceramic Composite is in tension, keeping the monolith layer in compression to counter the radial stress gradient across the clad during periods of high heat flux. The SiC—SiC composite can accommodate this stress gradient because of its higher tensile stress limit compared to dense, monolithic SiC. In addition, the composite layer can be engineered by adjusting the reinforcing fiber architecture. For instance, different braiding or winding angles can influence the relative cladding strength in the axial and hoop directions. This allows margin to design the most appropriate architecture to accommodate the stresses that are expected during the cladding lifetime. The outer SiC—SiC layer has the primary function of maintaining the structural integrity of the cladding in the event of failure of the inner monolithic SiC layer(s). All of this is again defined as being within the previously defined term "Ceramic Composite." Additional SiC layers may be added to provide additional features such as increased corrosion resistance, decreased pressure drop, increased heat transfer or other attributes. All this is again defined as being within the previously defined term "Ceramic Composite."

Figure 3:
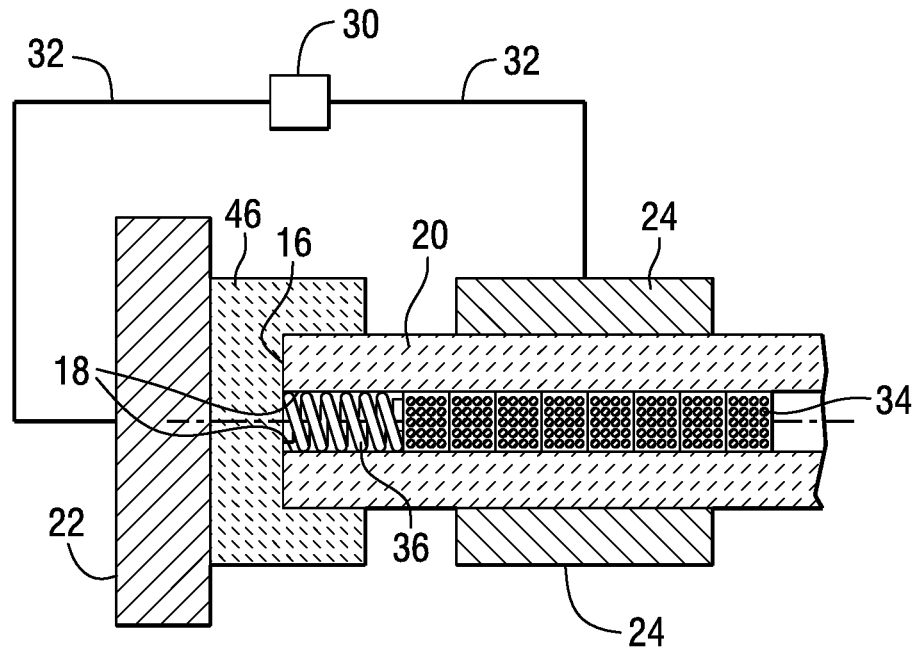
FIG. 3 illustrates a cross-sectional view of a SPS process for a SPS process using circumferential sealing one end at a time with secondary circumferential electrodes.
Figure 4:
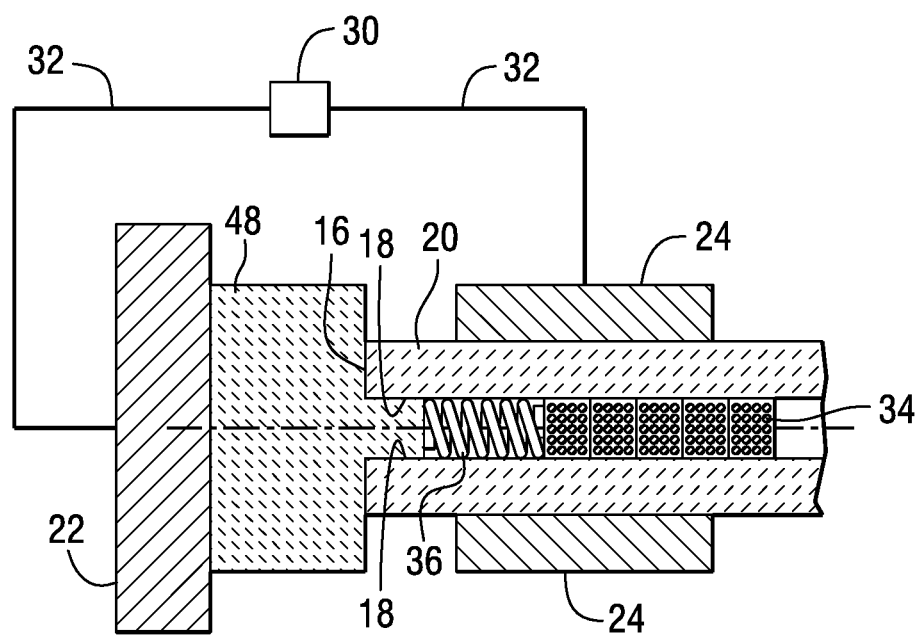
FIG. 4 illustrates a cross-sectional view of a SPS process using central internal and top sealing, one end cap at a time with secondary circumferential electrodes.

In this application, a vastly improved method specifically adapted to this specific technology, involves parameter improved electric field assisted sintering based technology plasma sintering is used with specific useful operating parameters disclosed discovered. Useful for this application, to join the SiC end plug to the tubular ceramic, at their interface; preferably a SiC-based fuel rod tube, and seal the tube with a back filled pressure up to 500 psi; that is, spark plasma sintering (SPS), versions pertinent to this invention, are shown in FIGS. 2-4.

Alternate approaches could use plugs with opposing faces that are either inside the tube or outside the tube. The SPS method has a heating rate as high as 1,500° C./min. and is capable of joining two SiC pieces or pre-pieces/precursors together in a few minutes. The desirable local temperature at the interface ranges from 1,400° C. to 2,150° C., the hold time ranges from 0.01 minutes to 60 minutes, preferably 5 minutes to 60 minutes, and the pressure ranges from 0.001 to 50 MPa, preferably, 5 MPa to 20 MPa.

Figure 2:
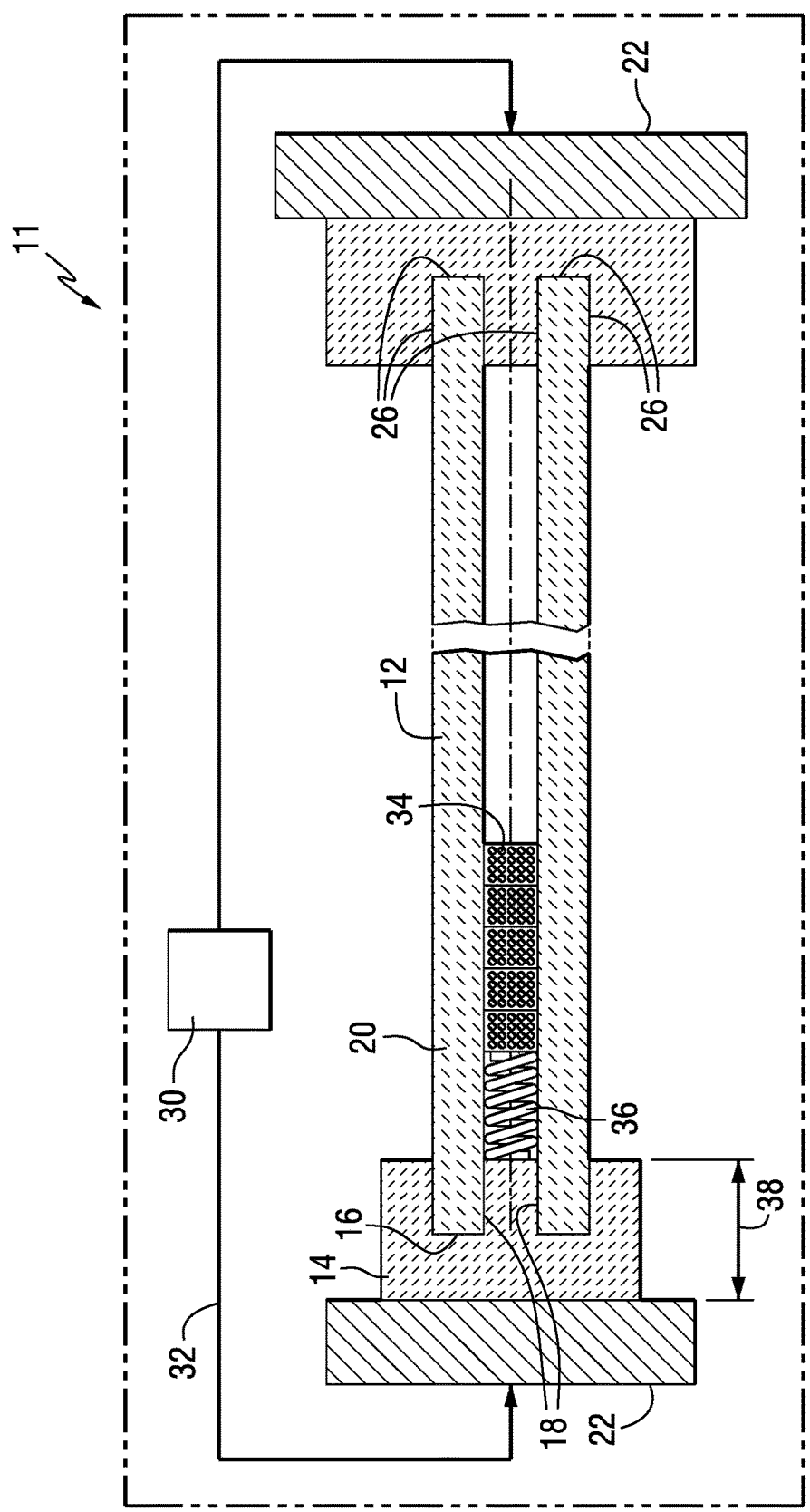
FIG. 2 illustrates a cross sectional view of a SPS process to seal end caps in a dual operation on both ends of a ceramic composite without secondary electrodes.

Turning now to the Figures, FIG. 2 illustrates use of a SPS process—spark plasma sintering—to apply, cement, fuse, ceramic end caps to the ceramic composite utilizing a spark plasma sintering apparatus 11, here using primary and optional secondary electrodes. Also an inert gas such as He is inserted into the tubes to provide an internal backpressure of 50 psi to 500 psi by well known processes, including drilling the end plugs, inserting the gas and refueling the end plug containing at least one ceramic composite tube 12, useful for holding nuclear fuel pellets in a nuclear reactor, disposed between at least one end cap 14 which end cap 14 engages the top 16 and interior 18 of the ceramic composite tube, and here also the circumferential exterior 20 of the ceramic composite tube. A paste may be applied to the end cap 14 or surfaces 16 and 18 to provide further sealing capability. At least two electrodes are attached to the end cap/tube, each electrode 22 adjacent to and in contact with the at least one end cap. The interface 26 between end caps and tube ends is most preferably polished to ensure better adhesion.

The sintering apparatus 11 may be pressurized in vacuum or be ambient temperature and be in a furnace with a temperature 50° C. up to 1,500° C. Also shown are pressure control/power supply means 30, power lines 32, fuel pellets 34 and pellet holding means, here spring 36. The end cap(s) are preferably SiC and the preferred space of end caps envelopment 38 is from 0.75 inch (1.905 cm) to 1.25 inch (3.175 cm).

Figure 5:
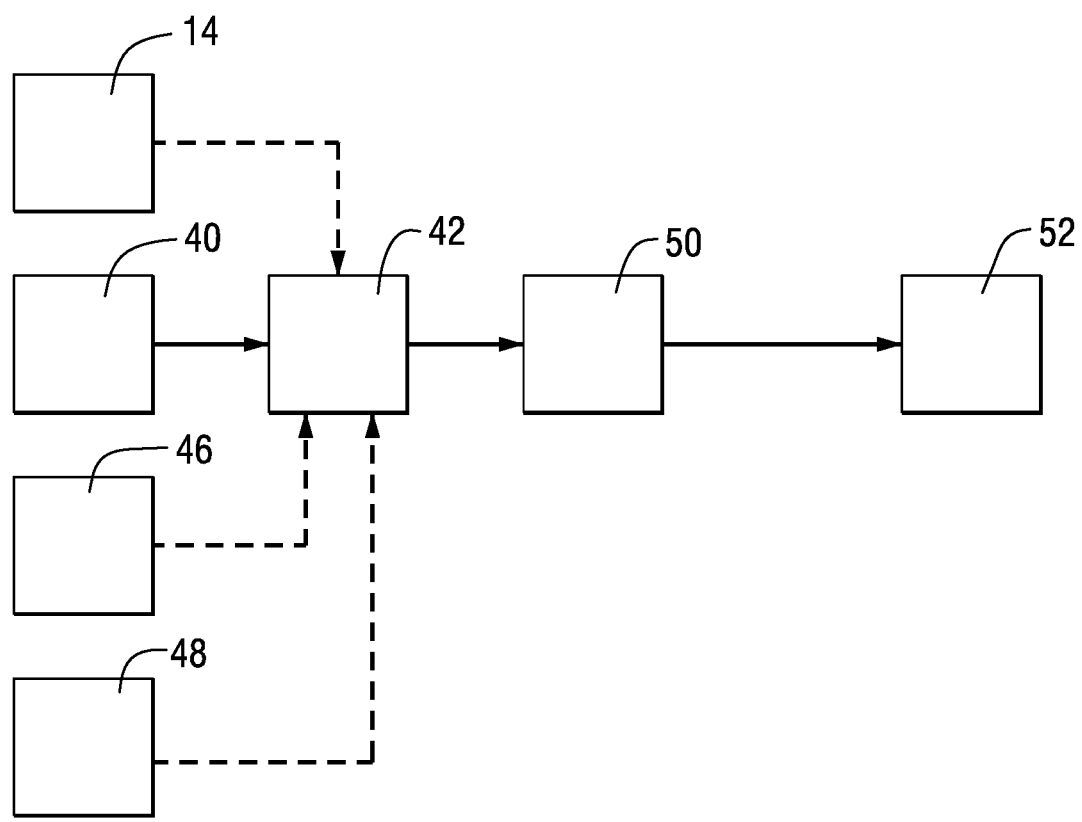
FIG. 5, which best shows the invention, illustrates a generally schematic flow diagram of the process.

FIG. 3, using the same numerals as FIG. 2, but using optional circumferential electrodes to seal one end at a time, describes a method where end cap(s) have a top and circumferential contact and FIG. 4 describes a method where end cap(s) have a top and interior contact. In these methods, there is at least one electrode 24 adjacent to and in contact with or surrounding the ceramic composite tube. FIG. 5 shows the method of this invention where 40, a tubular ceramic composite having interior and exterior tube walls and a circumferential axis is supplied; the ceramic composite has attached 42 to at least one end plug composition, preferably the same composition as the ceramic composite: an end cap 44 covering the top, interior and sides of the ceramic composite—a complete but complicated sealing end cap; or an end cap 46 just covering the top and sides of the ceramic composite tube shown in FIG. 3; or an end cap 48 covering the top and interior of the ceramic composite tube shown in FIG. 4. The end plug may be placed with or without paste on the end of the tube and electrodes applied to the tube and end plug(s) and all this applied into a spark plasma sintering means (11, 50) to hermetically seal the solidified end caps securely to the end of the ceramic composite 52.

Additionally, the following features may be present:
the use of 2-18 feet (60.96 to 548.64 cm) long end-sealed fuel rod tubes made of SiC which consists of at least one and up to three internal layers of monolithic SiC with >95% theoretical density, a layer made of SiC$_f$/—SiC composite and an optional outer layer of deposited SiC;
the use of the fuel rod tube above sealed with monolithic SiC or metal end plugs at one or both ends using the spark plasma sintering method with or without SiC precursor paste material at the joining interface, using other ceramic composite paste, metal brazing material, glass containing materials such as $SiO_2$—$Al_2O_3$, or metal brazing compounds such as Si and Al;
where the end plugs contain a circular slot with a width of 1.001 to 1.1 times of the thickness of the fuel rod tube and a depth of 0.05 to 0.5 inches (0.127 to 1.27 cm) where the fuel rod tube is sealed;
where the end plug fits inside or outside the fuel rod tube to a depth of 0.05 to 1 inches (0.127 to 2.54 cm) providing opposing faces where the fuel rod tube is sealed;
where the end plug composition/precursor material, but not the tube, is made in one of these methods: Chemical Vapor Deposition (CVD), cold extrusion followed by pressureless sintering, HIP, or additive manufacturing methods such as 3D printing and laser assisted deposition/sintering;
where the SiC precursor material has a density from 35% to 60% of the theoretical value;
where the opposing interface surfaces of the end plug and fuel rod tube are polished to a mirror finish or polished with a 320 grit diamond paper or finer; and
where the inner diameter of the fuel rod tube ranges from 0.25 to 0.60 inch (0.635 to 1.524 cm), and the thickness of the tube ranges from 0.01 to 0.15 inch (0.025 to 0.381 cm).

This invention provides a dramatic and probably futuristic method to commercially and practically produce a semi-flexible, controlled destruction, disaster capable, life saving sealed 2-18 feet (60.96-548.64 cm) long semi-flexible fuel rod tubes made of monolithic SiC and SiC fiber matrix, or other "ceramic composites," back filled with helium or other gas up to 500 psi.

The fuel rod tube preferably has a duplex structure which consists of an inner monolithic SiC layer or multiple layers and an outer SiC/SiC preferably composite layer. The tube is sealed with end plugs at one or both ends made of SiC or other material. The tube and end plugs are joined together using electric field assisted sintering technology such as the spark plasma sintering method. The joining can be performed at an ambient condition or in vacuum or in a pressurized chamber or in a heated chamber. The sealed tube is gas tight and will not deform under a differential pressure up to 10,000 psi at up to 1,500° C. for at least six years.

Example

A "Ceramic Composite" consisting of a 12 foot (365.76 cm) long extruded stoichiometric alpha phase nuclear reactor SiC tube, for containing nuclear fuel in a reactor, with an inner diameter of 0.32 inches (0.8128 cm) and a wall thickness of 0.015 inches (0.0381 cm) at a density of 95% of the SiC theoretical density, is wound with a 0.026 inch (0.066 cm) layer of SiC composite consisting of 6 layers of windings of stoichiometric beta phase SiC fibers and is infiltrated with beta phase stoichiometric SiC using chemical vapor infiltration to a net density for the composite of greater than 80% of the SiC theoretical density.

This "Ceramic Composite" was sealed with extruded stoichiometric alpha phase end plugs with highly polished inner and upper tube seal faces as in FIG. 4, applied using plasma spark sintering as well known and previously defined in a chamber filled with helium at 375 psi at ambient condition. The heating rate was 200° C./minute, with a bonding pressure of 5 MPa, a peak temperature of 2,100° C. at the plug/tube bonding interface, and with a hold time of from 5 minutes up to 60 minutes at the peak temperature.

This provided a method successfully applying end caps to the Ceramic Composite SiC tubes according to the adjusted spark plasma sintering process described previously; to provide a PSA sealed end tube with standard of nuclear pressure and temperatures, and substantially resilient to flex and fracture.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:
1. A method of hermetically sealing at least one end cap to a nuclear reactor fuel rod cladding tube comprising:
providing a nuclear reactor fuel rod cladding tube formed from multiple layers of a SiC—SiC ceramic composite, the tube having tube walls, at least one open end, and a circumferential axis, and providing at least one end cap, the end cap having an exterior side and an interior side;

applying the at least one end cap to the at least one open end of the tube to define an interface between a portion of the end cap and the tube;

applying at least one primary electrode to the exterior side of the at least one end cap;

applying current to the at least one primary electrode and using a spark plasma sintering means to supply a rapid temperature rise in the interface applied for 0.01 to 6.0 minutes at a rate accelerating within a range of greater than 1,000° C./min. up to 1,500° C./min. where the temperatures at the interface rise from ambient up to 2,500° C.

2. The method recited in claim 1 wherein the current is applied for 1.0 to 5.0 minutes.

3. The method recited in claim 1 wherein the current is applied at a pressure of 0.001 to 10 MPa.

4. The method recited in claim 1 wherein the at least one end cap is made from a material selected from the group consisting of multiple layers of a SiC—SiC ceramic composite, a ternary carbide, and a ternary nitride.

5. The method of claim 1 further comprising applying a secondary electrode to the exterior side of the tube.

6. A method of hermetically sealing at least one end cap to a nuclear reactor fuel rod cladding tube, the tube being formed from a ceramic composite, comprising:

providing a nuclear reactor fuel rod cladding tube formed from multiple layers of a SiC—SiC ceramic, the tube having tube walls, at least one end, and a circumferential axis;

applying at least one end cap to the at least one end of the tube to define an interface between a portion of the end cap and the tube, the end cap being formed from a composition selected from the group consisting of a SiC ceramic composition or a precursor to said ceramic composition, and having an exterior and interior side and;

applying at least one primary electrode to the exterior side of the at least one end cap;

applying current to the at least one primary electrode and using a spark plasma sintering means (SPS) for 0.01 to 6.0 minutes to supply a rapid temperature rise in the interface at a rate accelerating within a range of greater than 1,000° C./min. up to 1,500° C./min. to raise the interface temperature up to 2,500° C., and holding a peak temperature for 0.01 to 60 minutes at pressures from 0.001 MPa to 50 MPa to hermetically seal the tube to the at least one end cap.

7. The method recited in claim 6 wherein the interface temperature is raised in 1.0 to 5.0 minutes.

8. The method recited in claim 6 wherein the peak temperature is held at a pressure of 0.001 to 10 MPa.

9. The method recited in claim 6 wherein the at least one ceramic end cap is formed from the same composition as the composition forming the tube.

10. The method recited in claim 6 wherein the tube and end cap are-made from a SiC composite comprising monolithic SiC-based layer or multi-layers on the inside and at least one outer layer of SiC-based fibers in a SiC-based matrix.

11. The method of claim 6 further comprising applying a secondary electrode to the exterior side of the tube.

* * * * *